(12) United States Patent
Irizarry

(10) Patent No.: US 12,731,416 B2
(45) Date of Patent: Sep. 8, 2026

(54) SMART LICENSE PLATE DETECTION SYSTEM FOR LAND AND SEA VEHICLES

(71) Applicant: Adalberto Maldonado Irizarry, Virginia Beach, VA (US)

(72) Inventor: Adalberto Maldonado Irizarry, Virginia Beach, VA (US)

( * ) Notice: Subject to any disclaimer, the term of this patent is extended or adjusted under 35 U.S.C. 154(b) by 145 days.

(21) Appl. No.: 17/875,768

(22) Filed: Jul. 28, 2022

(65) Prior Publication Data

US 2023/0186655 A1 Jun. 15, 2023

Related U.S. Application Data

(60) Provisional application No. 63/289,422, filed on Dec. 14, 2021.

(51) Int. Cl.
*G06V 20/62* (2022.01)
*B60R 13/10* (2006.01)
(Continued)

(52) U.S. Cl.
CPC .......... *G06V 20/625* (2022.01); *B60R 13/105* (2013.01); *G06V 30/1444* (2022.01); *G07C 5/008* (2013.01); *G08G 1/0175* (2013.01)

(58) Field of Classification Search
None
See application file for complete search history.

(56) References Cited

U.S. PATENT DOCUMENTS 5,335,292 A * 8/1994 Lovelady ................. H04N 1/62 382/163
5,657,008 A * 8/1997 Bantli .................... G08G 1/017 342/51

(Continued)

FOREIGN PATENT DOCUMENTS

CN 100419932 C * 9/2008 .............. H02M 7/48
CN 103272307 B * 5/2016

(Continued)

OTHER PUBLICATIONS

Faun, DE 202015008179 U1, published on May 2, 2017 (machine translation) (Year: 2017).*

(Continued)

*Primary Examiner* — Chan S Park
(74) *Attorney, Agent, or Firm* — Eugenio J. Torres-Oyola; Victor Rodriguez-Reyes; Rafael Rodriguez-Muriel

(57) ABSTRACT

The present invention relates to a smart license plate detection system for all types of motor vehicles, both land and sea. The system comprises of a smart license plate and at least three colored lights, primarily green, yellow, and red, that establish an order to follow and may be on the vehicles when they are in motion, whether on land or on water, similar to traffic lights anywhere in the world. These colors may surround the square on the smart license plate's smart board that identifies the vehicle's state, and the public order officer may use the smart license plate detection system to prosecute the vehicle's owner for any misconduct. The system comprises a main unit comprising a microcontroller associated with a plurality of components to perform a plurality of operations, a communication block, and a cloud server adapted to store received data accessed using an application.

20 Claims, 6 Drawing Sheets

(51) Int. Cl.
*G06V 30/14* (2022.01)
*G07C 5/00* (2006.01)
*G08G 1/017* (2006.01)

(56) References Cited

U.S. PATENT DOCUMENTS 6,360,006 B1 * 3/2002 Wang .................. G06V 30/162 382/164
7,525,205 B2 * 4/2009 Mabuchi ............... B60C 23/041 290/1 R
8,582,819 B2 * 11/2013 Rodriguez Serrano ..................... G06V 20/62 382/105
8,588,470 B2 * 11/2013 Rodriguez Serrano ..................... G06V 10/772 382/105
8,912,912 B2 * 12/2014 Menard .................. B60L 58/12 340/455
9,064,433 B2 * 6/2015 Jumblatt ................ B65D 23/12
9,403,548 B2 * 8/2016 Hannah ................ G05D 1/0016
9,466,988 B2 * 10/2016 Deyaf ...................... H04B 5/26
9,824,289 B2 * 11/2017 Kozitsky ................... G06T 7/11
10,026,004 B2 * 7/2018 Mizes ....................... G06T 5/94
10,032,395 B2 * 7/2018 Jumblatt ............... G09F 19/205
10,193,102 B2 * 1/2019 Kanaya ................ H10K 50/167
10,730,511 B2 * 8/2020 Breuel ................... G08G 1/149
10,814,833 B1 * 10/2020 Goetzinger ............. B60R 25/23
10,970,943 B2 * 4/2021 Hay, II .................. B60Q 1/444
11,440,468 B2 * 9/2022 Golduber ............... B60Q 1/543
11,450,204 B2 * 9/2022 Turato ................. G08G 1/0116
11,501,543 B2 * 11/2022 Das .......................... G06T 3/60
11,590,898 B2 * 2/2023 Consolacion ............. B60R 7/02
2004/0081346 A1 * 4/2004 Louden ................ G06F 11/277 382/141
2004/0262613 A1 * 12/2004 Maekawa ............. C23C 16/345 257/E21.293
2005/0131751 A1 * 6/2005 Ahlers ............... G06Q 30/0241 705/7.36
2005/0176400 A1 * 8/2005 Mullet ............... G07C 9/00182 455/403
2006/0054335 A1 * 3/2006 Rapp ...................... H05K 5/061 177/238
2007/0230810 A1 * 10/2007 Kanatsu ............... G06V 30/413 382/173
2008/0048521 A1 * 2/2008 Mabuchi ................ H04R 19/01 310/309
2008/0136660 A1 * 6/2008 Bailey .................... H05B 45/00 340/815.45
2010/0257763 A1 * 10/2010 Hu ........................ B60R 13/105 40/209
2010/0314226 A1 * 12/2010 Patel ...................... H05B 47/19 200/237
2011/0314711 A1 * 12/2011 Jumblatt ................ B65D 23/12 215/6
2012/0068856 A1 * 3/2012 Menard ................... B60L 58/12 340/870.02
2013/0129151 A1 * 5/2013 Rodriguez Serrano ..................... G06V 10/772 382/105
2013/0129152 A1 * 5/2013 Rodriguez Serrano ..................... G06V 20/56 382/105
2013/0179771 A1 * 7/2013 Dent ..................... G06F 40/103 715/255
2013/0294653 A1 * 11/2013 Burry ..................... G06V 20/63 382/105
2014/0118239 A1 * 5/2014 Phillips ................. G06F 3/1454 345/156
2014/0233906 A1 * 8/2014 Neskin ................. A01K 15/025 386/224
2014/0259819 A1 * 9/2014 Dalpra .................. G09F 21/048 40/204
2014/0301606 A1 * 10/2014 Paul ....................... G06V 20/63 382/105
2014/0343753 A1 * 11/2014 Kirsch ................. G07C 5/0816 701/2
2015/0251584 A1 * 9/2015 Deyaf ...................... H04B 5/79 307/10.8
2015/0325157 A1 * 11/2015 Jumblatt ................. G09F 19/20 40/581
2016/0023675 A1 * 1/2016 Hannah .................. B60L 58/12 701/2
2016/0063860 A1 * 3/2016 Lickfelt ................. G08G 1/123 340/988
2016/0375898 A1 * 12/2016 Breuel .................. B60W 30/06 340/932.2
2017/0046929 A1 * 2/2017 Strom ..................... H04L 67/01
2017/0161581 A1 * 6/2017 Kozitsky ................ G06V 20/63
2017/0177968 A1 * 6/2017 Albertini .............. G06V 30/153
2018/0012101 A1 * 1/2018 Mizes ....................... G06T 5/94
2018/0191205 A1 * 7/2018 Koeppel ............. H02J 7/00034
2019/0057818 A1 * 2/2019 Yoshie .................... H02S 40/38
2019/0122460 A1 * 4/2019 Reyes .................... G08G 1/162
2019/0139327 A1 * 5/2019 Hay, II .................. B60W 40/10
2020/0043250 A1 * 2/2020 Maier .................. G06F 9/4451
2020/0189476 A1 * 6/2020 Consolacion ............ G07C 5/02
2020/0216017 A1 * 7/2020 Wassef .................. G07C 5/008
2020/0254926 A1 * 8/2020 Golduber ................ G09F 9/372
2021/0027086 A1 * 1/2021 Das ........................ G06V 10/26
2021/0035378 A1 * 2/2021 Lekutai .................. G07C 5/008
2021/0247637 A1 * 8/2021 Kishimoto ........ G02F 1/133553
2021/0256833 A1 * 8/2021 Daoura ................. H04W 4/021
2021/0312726 A1 * 10/2021 Schäfer ................... H04W 4/23
2022/0044504 A1 * 2/2022 Consolacion ...... G07C 9/00571
2022/0172611 A1 * 6/2022 Turato ................. H04B 10/073

FOREIGN PATENT DOCUMENTS

CN 210072827 U * 2/2020
CN 210089152 U * 2/2020
CN 210803931 U * 6/2020
CN 115243086 A * 10/2022 ............. H05B 45/20
DE 202015008179 U1 * 4/2017
JP 2004212167 A * 7/2004
JP 2005006745 A * 1/2005
JP 4101529 B2 * 6/2008
JP 2010271551 A * 12/2010
JP 2013061654 A * 4/2013
RU 210940 U1 * 5/2022

OTHER PUBLICATIONS

CN-103272307-B (machine translation) (Year: 2016).*
CN-100419932-C (machine translation) (Year: 2008).*
CN-115243086-A (machine translation) (Year: 2022).*
CN-210072827-U (machine translation) (Year: 2020).*
CN-210089152-U (machine translation) (Year: 2020).*
JP-2005006745-A (machine translation) (Year: 2005).*
JP-2010271551-A (machine translation) (Year: 2010).*
JP-2013061654-A (machine translation) (Year: 2013).*
CN-210803931-U (machine translation) (Year: 2020).*
JP-2004212167-A (machine translation) (Year: 2004).*
JP-4101529-B2 (machine translation) (Year: 2008).*
RU-210940-U1 (machine translation) (Year: 2022).*

* cited by examiner

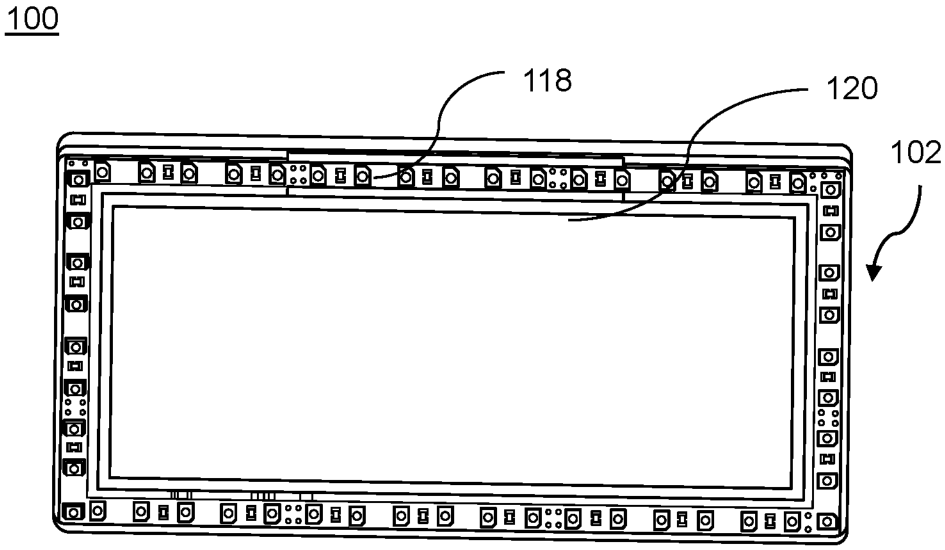
FIG. 1A
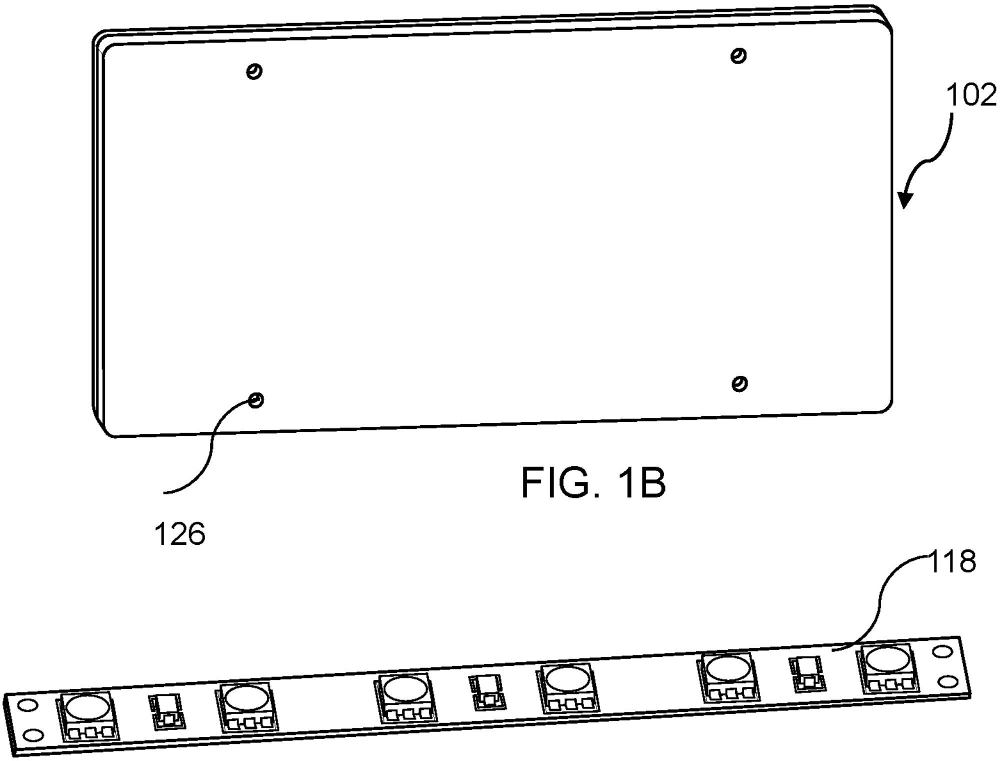
FIG. 1B
FIG. 1C

SMART LICENSE PLATE DETECTION SYSTEM FOR LAND AND SEA VEHICLES

CROSS-REFERENCE TO RELATED APPLICATION

This disclosure claims the benefit of the priority of U.S. Provisional Patent Application No. 63/289,422 entitled "SMART LICENSE PLATE DETECTION SYSTEM FOR LAND AND SEA VEHICLES" and filed on Dec. 14, 2021. The above-identified application is incorporated herein by reference in its entirety.

BACKGROUND

Field of Invention

The present invention generally relates to detection system, and more particularly, to a smart license plate and a smart license plate detection system for land and sea motor vehicles.

Description of Related Art

A vehicle registration plate, sometimes known as a license plate, is required for motor vehicles travelling by land or sea in different countries. This vehicle's registration plate is usually found on the rear portion; however, it can also be found on the front. The registration plate contains information such as the vehicle's registration number and the state in which the license plate is registered.

Provisions (Laws) or administrative procedures govern all forms of motor vehicles, both on land and at sea. These motor vehicles must be handled in accordance with these laws and administrative procedures, as well as the state-imposed taxes on their use.

To monitor and regulate traffic, including pedestrians, drivers of motor vehicles, and cyclists, traffic regulations and equipment are put in place. As is generally known, there are many traffic rule violators in our country today, which has resulted in a number of accident incidences without any consequences being applied. Because the proper protocols have not been put in place, these traffic lawbreakers operate with freedom and assurance, knowing that they might never be discovered.

It is critical in many situations for people to be able to see the information on the registration plate. For example, the vehicle registration plate is frequently inspected by police who need to know vital information about a vehicle when pulling it to the side of the road or sea for a violation of traffic regulations or other reasons. Other motorists may need to be able to see the information on the license plate during an accident. A prominent vehicle registration plate also allows the right authorities to immediately identify the vehicle if it is abandoned.

Regardless of the fact that law enforcement agencies have equipment that allows them to track a driver's background once they have been arrested, the truth is that even with this equipment, it is challenging for them to know where they are. As a result, they continue to break the law.

These modes of transportation are also utilized to steal children, individuals, and transfer prohibited narcotics and weaponry. They're also utilized to commit crimes including murder, terrorism, and female rape, among others.

Many automobile registration plates are composed of metal, with raised or stamped letters that are frequently painted on. Due to the difficulty of seeing the registration number and state information on these car registration plates, especially during the dark hours, special color lights or reflective paints have been employed to improve visibility. Many vehicles are also equipped with lights that are specifically designed to illuminate the registration plate.

Much of this additional helpful information is dynamic in nature, changing as the driver and vehicle travel through different regions and areas, or as other circumstances change, such as the vehicle being involved in an accident or being rendered disabled, or the driver experiencing a medical emergency.

SUMMARY

Creating a smart and an electrical design based on number plates is one of the objectives of the current invention.

Accessing a motor vehicle's status at any time via a web-based platform or an application that uses cloud communication protocols is another objective of the present invention.

According to an embodiment of the present invention provide a smart license plate detection system for a plurality of motor vehicles. The system comprising a smart license plate having a housing and a display unit to display a motor vehicle number and a specific state logo. The housing also including a plurality of LED strips operatively connected to at least one circuit board present within the housing. The plurality of LED strips are present around the periphery of the housing to show the status of the motor vehicle. The system comprising a main unit comprising a microcontroller associated with a plurality of components to perform a plurality of operations. The main unit also include a communication block configured to transmit and receive data to a cloud server. The cloud server adapted to store received data accessed using an application installed in a user device.

Embodiments in accordance with the present invention provide a smart license plate comprising a housing, at least two circuit board, at least three separate-colored lights, primarily green, yellow, and red, that establish a follow-up order and may be on vehicles when they are in motion, whether on land or on water, similar to traffic lights anywhere in the world. The smart license plate may be formed in a thin rectangular shape, similar to that of a commonly used vehicle registration plate. The colors may surround the square on the smart license plate's smart board that may identify the vehicle's status, and the public order officer may use to prosecute the vehicle's owner for any misconduct.

According to an embodiment of the present invention a method for detecting smart license plate associated with a plurality of motor vehicles is provided. The method comprising configuring a smart license plate having a housing and a display unit to display a motor vehicle number and a specific state logo. The method also includes connecting a plurality of LED strips to at least one circuit board present within the housing. The plurality of LED strips presents around the periphery of the housing to show the status of the motor vehicle. The method also includes configuring a main unit comprising a microcontroller associated with a plurality of components. The microcontroller is configured to detect the moving motor vehicle using a detection module, perform image acquisition by capturing an RGB (Red, Green, and Blue) color image of the motor vehicle to extract details in real-time, pre-process the acquired image by using a plurality of pre-processing techniques to convert the RGB color image in three-dimensional to two-dimensional gray format, recognize the license plate by searching and applying computer vision techniques, segment to isolate the image from background in order to properly identify a text, and recognize characters by detecting and identifying image frames and converting to meaningful text in ASCII (American Standard Code for Information Interchange). The method also includes configuring a communication block to transmit and receive data to a cloud server. The method also includes adapting the cloud server to store received data accessed using an application installed in a user device.

In one embodiment of the present invention, the at least two circuit board may be smart boards that may be configured to allow the compliance agency in charge of land and sea vehicles to send an email or text message to the owner's cell phone informing them of an administrative violation and requiring them to comply with the law's terms before being detained by law enforcement officers and summoned before a competent court. Once the owner receives the email and SMS.

According to an embodiment of the present invention a smart license plate is provided. The smart license plate comprising a housing that may further include a display unit a display configured to display a motor vehicle number and a specific state logo. The housing also includes a power management assembly for powering a plurality of components present in the smart license plate. The housing further includes an antenna positioned at a lower portion inside the housing to reduce electromagnetic screening when the smart license plate is attached to the motor vehicle. The housing also includes at least two circuit board. The smart license plate further includes a plurality of LED strips operatively connected to at least two circuit board present within the housing. The plurality of LED strips present around the periphery of the housing to show the status of the motor vehicle.

These and other advantages will be apparent from the present application of the embodiments described herein.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein:

FIG. 1A illustrates a front view of the smart license plate, according to embodiments of the present invention disclosed herein;

FIG. 1B illustrates a back view of the smart license plate, according to embodiments of the present invention disclosed herein;

FIG. 1C illustrates a perspective view of a LED strip of the smart license plate, according to embodiments of the present invention disclosed herein;

Figure 1D:
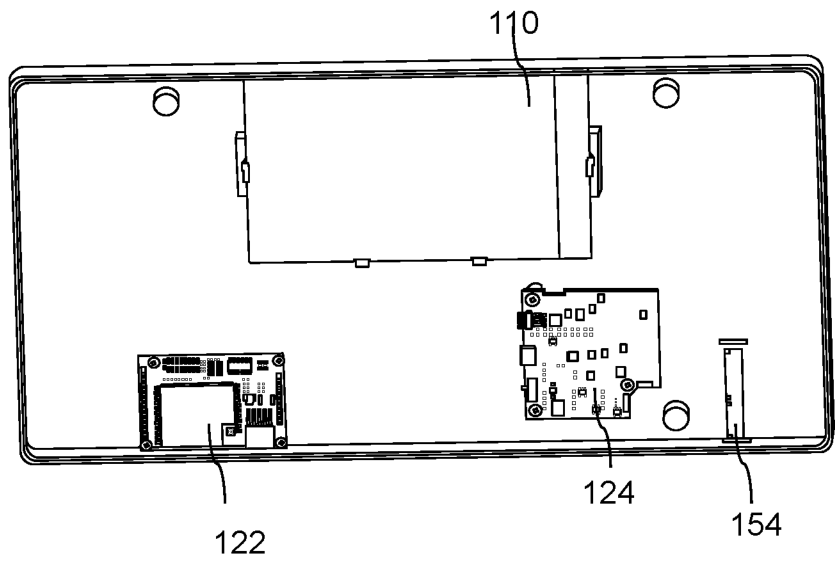
FIG. 1D illustrates a sectional view of the smart license plate with a plurality of components, according to embodiments of the present invention disclosed herein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The following description includes the preferred best mode of one embodiment of the present invention. It will be clear from this description of the invention that the invention is not limited to these illustrated embodiments, but the invention also includes a variety of modifications and embodiments thereto. Therefore, the present description should be seen as illustrative and not limiting. While the invention is susceptible to various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

In any embodiment described herein, the open-ended terms "comprising," "comprises," and the like (which are synonymous with "including," "having" and "characterized by") may be replaced by the respective partially closed phrases "consisting essentially of," consists essentially of," and the like or the respective closed phrases "consisting of," "consists of, the like.

As used herein, the singular forms "a", "an", and "the" designate both the singular and the plural, unless expressly stated to designate the singular only.

The present invention generally relates to a smart license plate detection system for land and sea motor vehicles.

FIG. 1A illustrates a front view of the smart license plate 100, according to embodiments of the present invention. The smart license plate 100 comprises a housing 102 that may further include a plurality of LED strips 118 present around the periphery of the housing 102 to show the status of a motor vehicle. The plurality of LED strips 118 in one illustrative embodiment of the invention may be one continuous strip or multiple strips joined together. Another illustrative embodiment of the present invention allows for the use of cut-out strips to make up the plurality of LED strips 118.

The smart license plate 100 further comprises a display unit 120 to display a motor vehicle number and a specific state logo. The display unit 120 associated with the smart license plate 100 may be an E-paper display with low power consumption, high definition and paper-like appearance.

FIG. 1B illustrates a back view of the smart license plate 100, according to embodiments of the present invention. In one of the embodiments of the present invention, the housing 102 of the smart license plate 100 may be designed with a plurality of mounting holes 126 so that the smart license plate 100 may be mounted on a predefined location of the vehicle. Other affixing components may be used for mounting the smart license plate 100. According to an embodiment of the present invention comprises clamps, bolts, adhesives, welding, or other appropriate components for securing housing to the vehicle.

FIG. 1C illustrates a perspective view of a LED strip of the smart license plate 100, according to embodiments of the present invention. The plurality of LED strips 118 present around the periphery of the housing 102 show the status of the motor vehicle. Each of the LED strips 118 is a RGB LED strip used around the periphery of the e-paper display to show the status of the motor vehicle. Each of the LED strips 118 comprises three colors Red, Green and yellow, each color indicates the specific status of the motor vehicle.

In one of the embodiments of the present invention, the smart license plate 100 may comprise at least three lights. In an embodiment of the present invention, the lights may be a green light, a yellow light, a red light, and so forth.

FIG. 1D illustrates a sectional view of the smart license plate 100 with a plurality of components, according to embodiments of the present invention. The housing 102 further comprises an antenna 154 positioned at a lower portion inside the housing 102 to reduce electromagnetic screening when the smart license plate 100 is attached to the motor vehicle. The antenna 154 may be adapted to receive data sent by satellites through a dedicated RF frequencies and timestamps from each visible satellite, along with other pieces of data. The housing 102 comprises a plurality of LED strips 118 operatively connected to at least one circuit board 122, 124 present within the housing 102.

According to embodiments of the present invention, the smart license plate 100 may comprise the power management assembly 110 for powering the plurality of LEDS strips 118 that serve as a battery powered backup and is attached inside the housing 102 through a plurality of supporting components 128.

In one of the embodiments of the present invention, the circuit board 122, 124 may be termed as a smart board which further defines as a board that gathers the vehicle's information on the basis of department of motor vehicle. The smart board on the smart license plate 100 may have a logo in the center that the land vehicle or boat owner chooses. Like for a veteran of the army, something allusive to the army signature might be chosen, a disability logo etc. The logo may depend upon the area, region or category of a vehicle owner.

In one embodiment of the present invention, the smart board may be configured to allow the compliance agency in charge of land and sea vehicles to send an email or text message to the owner's cell phone informing them of an administrative violation and requiring them to comply with the law's terms before being detained by law enforcement officers and summoned before a competent court. Once the owner receives the email and SMS.

Figure 1E:
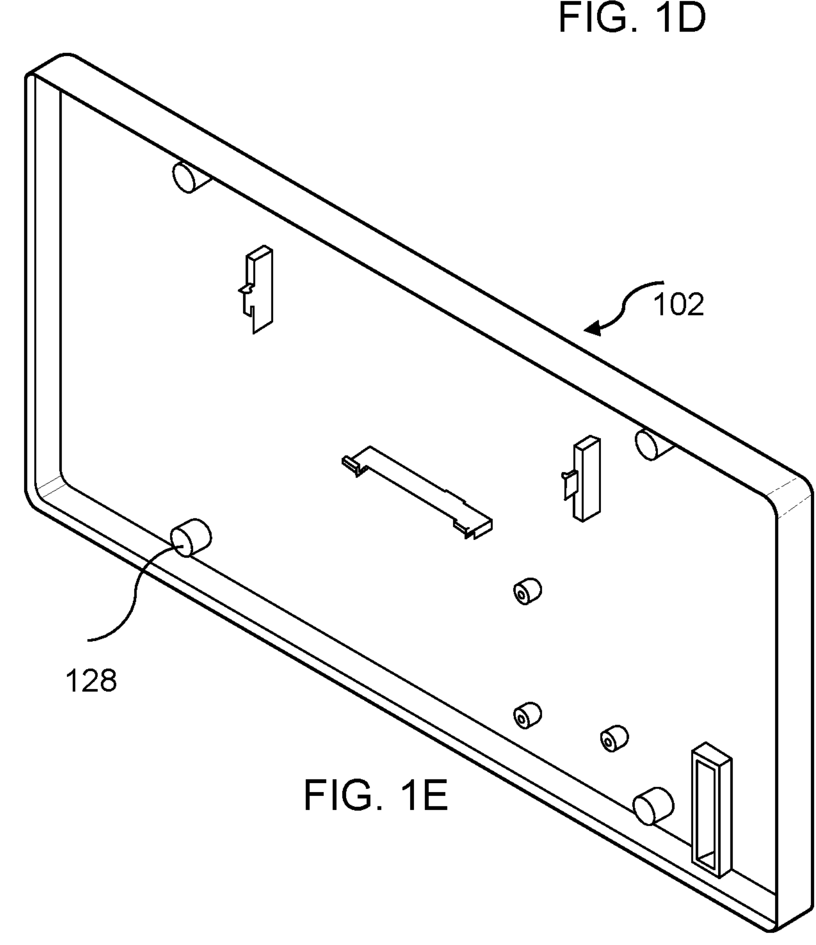
FIG. 1E illustrates a sectional view of the smart license plate without components, according to embodiments of the present invention disclosed herein.

According to some aspects of the present invention, FIG. 1E shows a sectional view of the smart license plate 100 without components. FIG. 1E shows the housing 102 together with a number of supporting components 128. In FIG. 1E, a blank space for mounting the power management assembly 110 connected to the housing 102 may be seen. Additionally, the circuit board 122, 124, often referred to as PCB board, and antenna 154's allocated placement region may be visible.

Figure 1F:
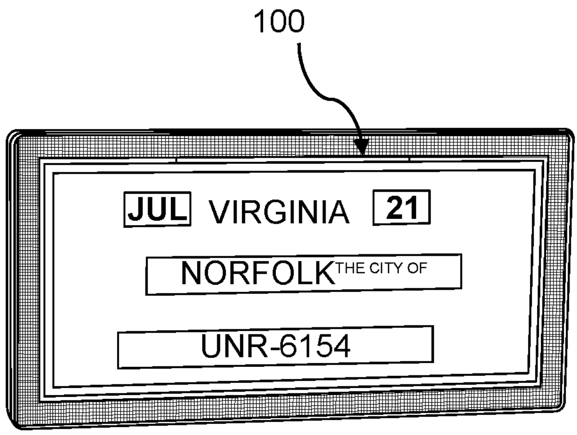
FIG. 1F illustrates the perspective view of the smart license plate glowing in yellow color, according to embodiments of the present invention disclosed herein.

FIG. 1F illustrates the perspective view of the smart license plate 100 glowing in yellow color, according to embodiments of the present invention. The yellow light in the smart license plate detection system 100 determines that the vehicle driven on the road or on water may be under the total compliance of the motor vehicle law according to the category of the vehicle but also there may be a category defined to fulfil according to the law which must be completed in order to shift to a green light. If the category is not met under the compliance of the law by the owner of the vehicle than the vehicle may jump to the red-light category.

Figure 1G:
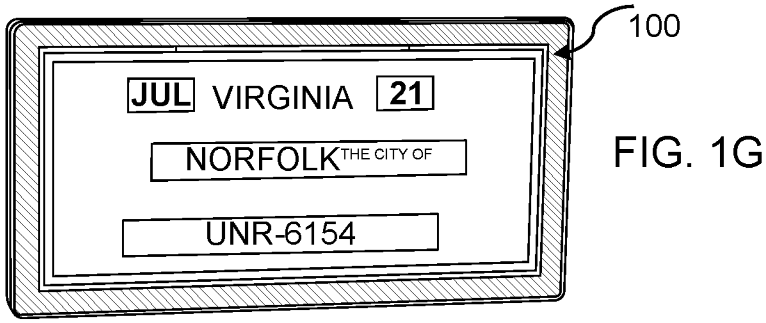
FIG. 1G illustrates a perspective view of the smart license plate glowing in green color, according to embodiments of the present invention disclosed herein.

FIG. 1G illustrates a perspective view of the smart license plate 100 glowing in green color, according to embodiments of the present invention. The green light in the smart license plate 100 determines that the vehicle driven on the road or on water may be under the total compliance of the motor vehicle law according to the category of the vehicle.

Figure 1H:
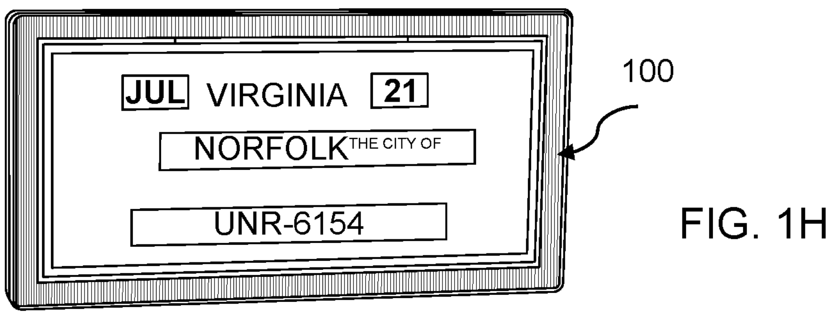
FIG. 1H illustrates a perspective view of the smart license plate glowing in red color, according to embodiments of the present invention disclosed herein.

FIG. 1H illustrates a perspective view of the smart license plate 100 glowing in red color, according to embodiments of the present invention. The red light in the smart license plate 100 may indicate a vehicle being driven on the road or on the water that is not in conformity with the law, depending on the vehicle's category. The non-compliant vehicle poses a risk to the surroundings and the environment, so this needs to be stopped right away.

Figure 2A:
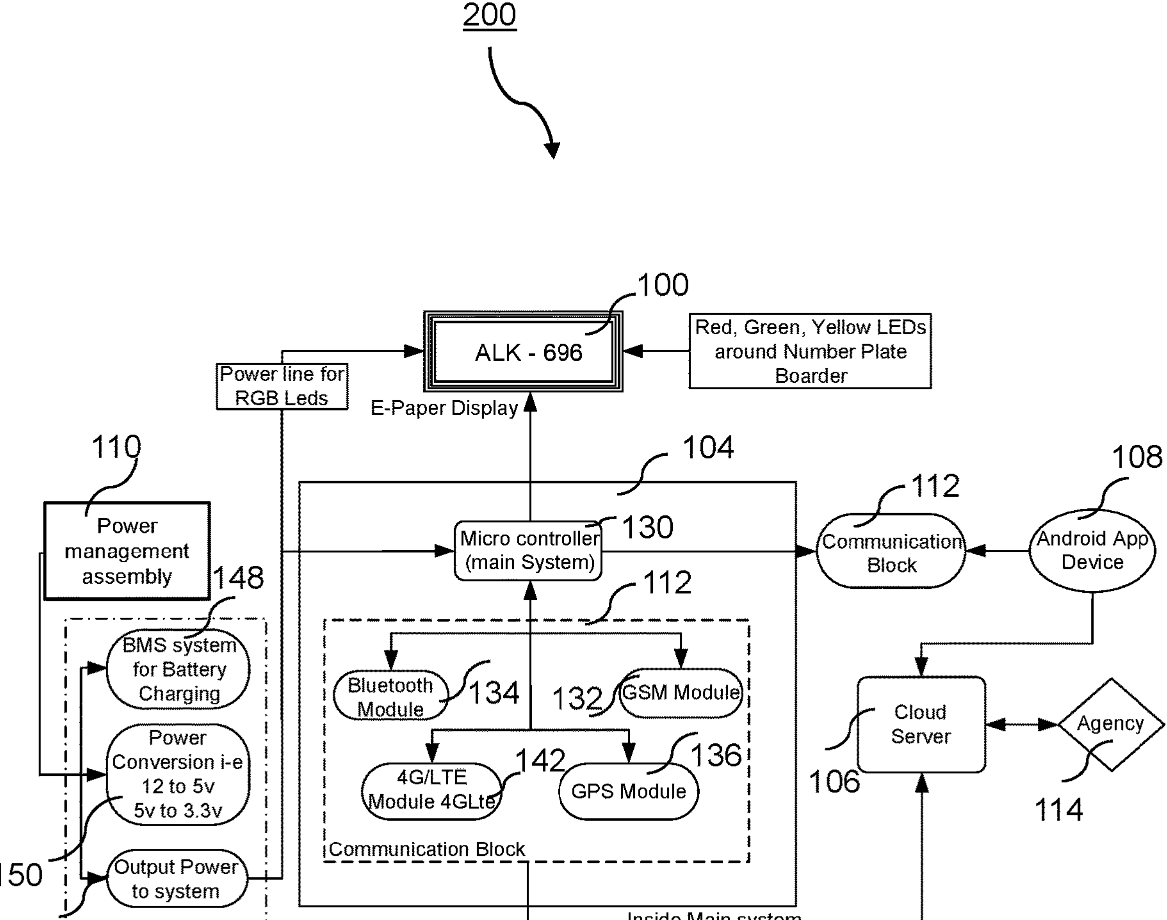
FIG. 2A illustrates a block diagram of the smart license plate detection system, according to embodiments of the present invention disclosed herein.

FIG. 2A illustrates a block diagram of the smart license plate detection system 200, according to embodiments of the present invention. The smart license plate detection system 200 may comprise a smart license plate 100, a main unit 104, a cloud server 106, the application 108, a power management assembly 110, a communication block 112, and an agency 114. The smart license plate 100 may be formed in a thin rectangular shape, similar to that of a commonly used vehicle registration plate.

A housing 102 for the smart license plate 100 may also have a display unit 120 that may show a vehicle identification number and a logo of a particular state. The power management assembly 110 is also a part of the housing 102 and the power management assembly 110 powers a number of the smart license plate's components. In order to lessen electromagnetic screening when the smart license plate is attached to the car, the housing 102 also has an antenna 154 placed at a lower point within.

Additionally, the housing 102 has two or more circuit boards also known as PCB board. The smart license plate 100 also has a number of LED strips 118 that are operationally connected to at least two circuit boards 122, 124 that are housed inside the housing 102. Several LED strips 118 are installed around the housing's 102 perimeter to display the status of the motor vehicles.

In addition, a detailed description of the smart license plate 100 is provided with reference to FIGS. 1A-1J. According to an embodiment of the present invention, the main unit 104 may comprise the microcontroller 130 associated with a plurality of components to perform a plurality of operations.

Furthermore, the main unit 104 comprises the communication block 112 configured to transmit and receive data to the cloud server 106. According to embodiments of the present invention, the communication block 112 may comprise a GSM module 132, a Bluetooth module 134, a GPS module 136, 4G module 142, and so forth.

According to one embodiment of the invention, the Bluetooth communication module 134 uses a communication protocol and can be set up to transmit a Wi-Fi credential, an SSID, and a password. A number of processors may be included in the GPS module 136 in order to determine the location of the car at a specific moment.

The cloud server 106 may be adapted to store received data accessed using the application 108 installed in a user device. In a preferred embodiment of the present invention, the application 108 may be installed on the user device may be configured to check the status of a user's respective motor vehicle and send/receive data over the cloud server 108 by using the application 108.

In an embodiment of the present invention, the output power unit 152 may be configured to distribute power in the plurality of components at a level for providing safety against a short circuit.

The microcontroller 130 communicates with the application 108 using the communication block 112. The system 100 further comprises an agency 114 that may comprise a police department, a surveillance department, or any other department that is adapted to monitor the data over the cloud server 106 and perform an action based on data received.

In one of the embodiments of the present invention, the LED strips 118 comprises at least three lights of green, yellow and red color that have different purpose in this smart license plate 100 which determines the status of the motor vehicles. Moreover, lights may be associated with the housing 102 around the periphery of the smart license plate 100 in rectangular shape.

In an exemplary embodiment of the present invention, when a land or sea motor vehicle is stolen, the owner may be assigned a number that the transportation regulatory agency may use to undertake an instant search of the vehicle, with the available smart board color in this case being red. The same protocol may be activated when land and sea vehicles are utilized for unlawful acts like as drug trafficking, terrorism, human trafficking, weapon sales, and so on, with the red color of the smart board equating to the quick arrest of these lawbreakers.

When the land or sea motor vehicle is stolen, the owner of the vehicle may communicate immediately using the number established by the Department of Motor Vehicles or the government through legislation, and they may locate the land or sea motor vehicle in real time using the satellite map and GPS provided by the Smart License Plate color, according to one embodiment of the present invention. When kidnappings happen, the same procedure is followed.

Because such information may be available or contained in the car or boats owner's registry, the vehicle's data center system, and the smart License Plate 100, in one embodiment of the present invention, it is not necessary to cling or stick to the front of the vehicle, the expiration date, or the inspection stamp with the smart board. This makes it difficult for the vehicle to be stolen because it has all of the vehicle's information.

The main unit 104 including the microcontroller 130 associated with a plurality of components. The microcontroller 130 may be configured to detect the moving motor vehicle using a detection module, perform image acquisition by capturing an RGB (Red, Green, and Blue) color image of the motor vehicle to extract details in real-time, pre-process the acquired image by using a plurality of pre-processing techniques to convert the RGB color image in three-dimensional to two-dimensional gray format, recognize the license plate by searching and applying computer vision techniques, segment to isolate the image from background in order to properly identify a text, and recognize characters by detecting and identifying image frames and converting to meaningful text in ASCII (American Standard Code for Information Interchange).

In an embodiment of the present invention, the system 200 further comprises a communication block 112 configured to transmit and receive data to a cloud server 106. The cloud server 106 may be adapted to store received data accessed using an application 108 installed in the user device.

The system 100 may also comprise a monitoring module employed by an agency 114 to monitor the data over the cloud server and perform an action based on data received.

The system 200 may, in accordance with some embodiments of the present invention, include the power management assembly 110 connected to the smart license plate 100 for powering the numerous LEDS strips 118. The power management assembly 110 may serve as a battery-powered backup and is attached inside the housing 102 by a number of supporting components 128. A BMS (battery management system) 148, a power conversion unit 150, an output power unit 152, and other components are included in the power management assembly 110.

Figure 2B:
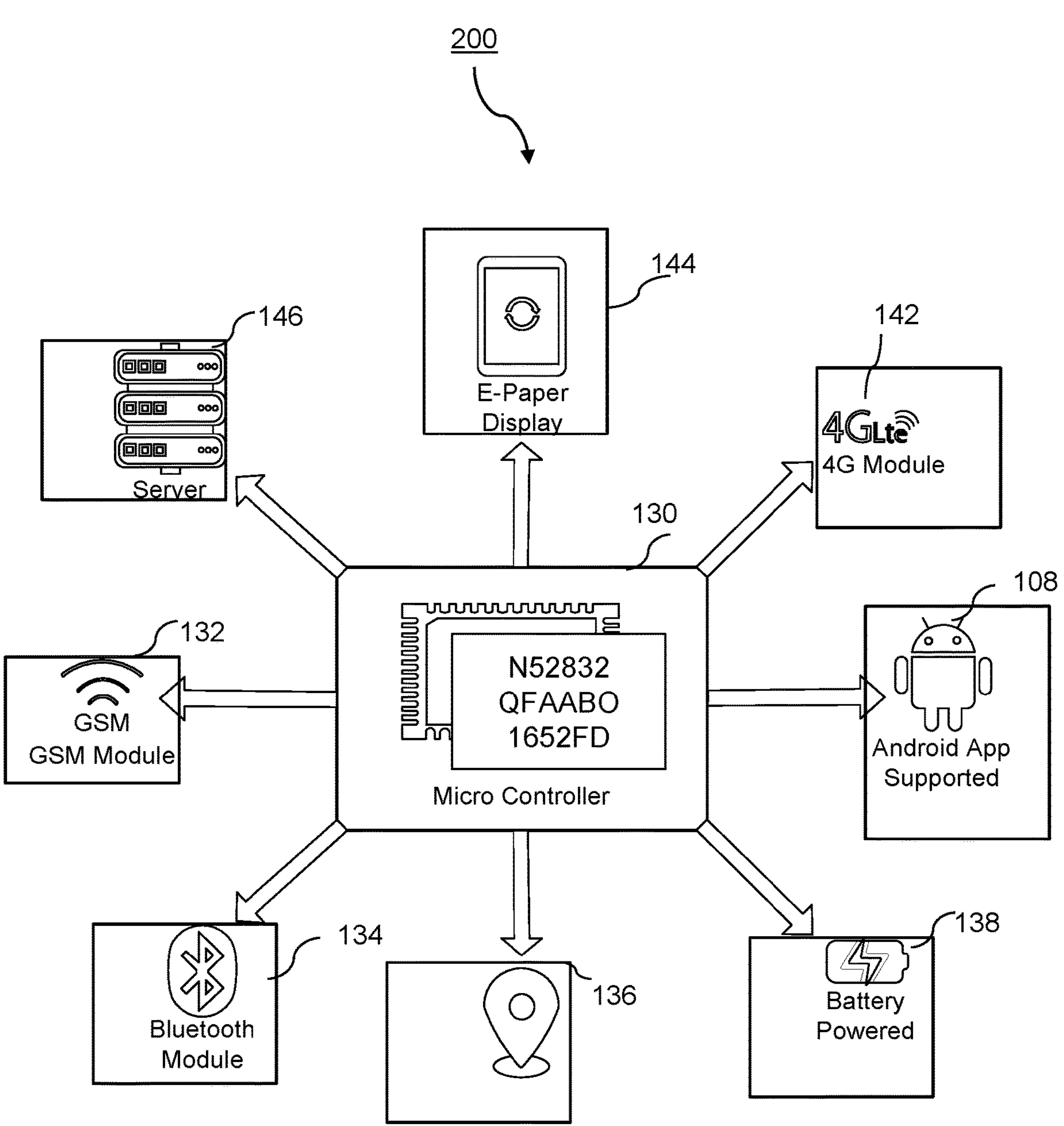
FIG. 2B illustrates another block diagram of components associated with a microcontroller of the smart license plate detection system, according to embodiments of the present invention disclosed herein.

FIG. 2B illustrates a block diagram of components associated with a microcontroller 130 of the smart license plate detection system 200, according to embodiments of the present invention. A microcontroller 130 may be associated with a plurality of components to perform a plurality of operations. The microcontroller 130 may be configured to detect the moving motor vehicle using a detection module. The microcontroller 130 may be configured to perform image acquisition by capturing an RGB (Red, Green, and Blue) color image of the motor vehicle to extract details in real-time.

The microcontroller 130 may be configured to pre-process the acquired image by using a plurality of pre-processing techniques to convert the RGB color image in three-dimensional to two-dimensional gray format. The microcontroller 130 may be configured to recognize the smart license plate 100 by searching and applying computer vision techniques.

The microcontroller 130 may be configured to segment to isolate the image from background in order to properly identify a text. The microcontroller 130 may be configured to recognize characters by detecting and identifying image frames and converting to meaningful text in ASCII (American Standard Code for Information Interchange).

In an embodiment of the present invention, the Bluetooth communication module 134 employs a communication protocol and the Bluetooth communication module 134 may be configured to provide a Wi-Fi credential, a SSID, and a password. The GPS module 136 may comprise a plurality of processors configured to get the location of the motor vehicle at a particular time.

In accordance with implementations of the present invention, the system 200 may include the battery-powered 138 to act as a backup battery. In a preferred implementation of the present invention, the application 108 may be loaded on the user device and set up to send and receive data over the server 146 while also allowing users to check the status of their individual motor vehicles.

The display unit 120 that is associated with the license plate 100 might be an E-paper display 144 with high definition, low power requirements, and a paper-like look.

Figure 3:
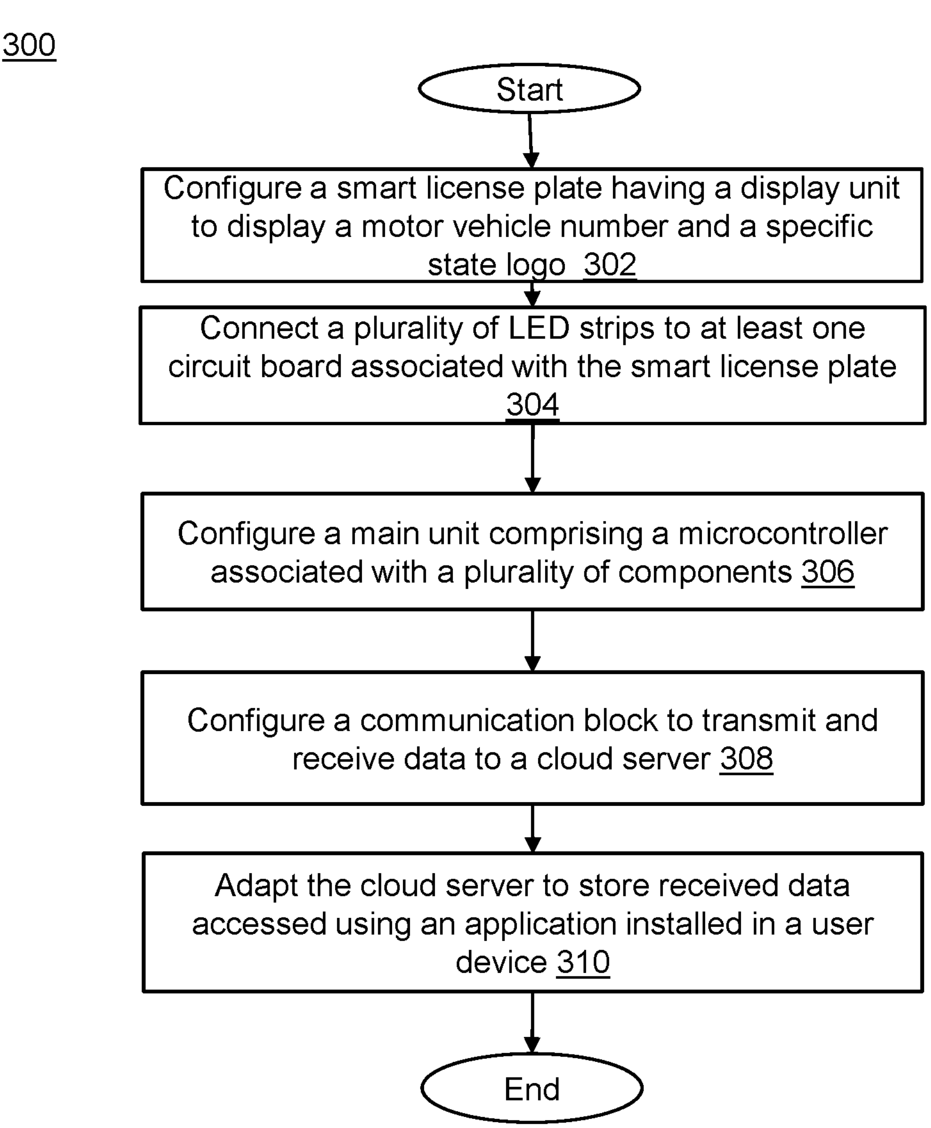
FIG. 3 illustrates a flowchart of a method for the smart license plate detection system, according to embodiments of the present invention disclosed herein.

FIG. 3 illustrates a flowchart of a method 300 of the smart license plate detection system 200, according to embodiments of the present invention.

At 302, configuring the smart license plate 100 having the display unit 120 to display the motor vehicle number and the specific state logo.

At 304, connecting the plurality of LED strips 118 to at least one circuit board 122, 124 associated with the smart license plate 100. The plurality of LED strips 118 present around the periphery of the housing 102 of the smart license plate to show the status of the motor vehicle.

At 306, configuring the main unit 104 comprising the microcontroller 130 that may be further associated with the plurality of components. The microcontroller 130 may be configured to detect the moving motor vehicle using a detection module, perform image acquisition by capturing an RGB (Red, Green, and Blue) color image of the motor vehicle to extract details in real-time, pre-process the acquired image by using a plurality of pre-processing techniques to convert the RGB color image in three-dimensional to two-dimensional gray format, recognize the license plate by searching and applying computer vision techniques, segment to isolate the image from background in order to properly identify a text, recognize characters by detecting and identifying image frames and converting to meaningful text in ASCII (American Standard Code for Information Interchange).

At 308, configuring the communication block 112 to transmit and receive data to the cloud server 106.

At 310, adapting the cloud server 106 to store received data accessed using the application 108 installed on the user device.

In an embodiment of the present invention the method 300 may further comprise monitoring data over the cloud server 106 and performing an action based on data received through the agency 114 including a police department, a surveillance department, or any other department.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements within substantial differences from the literal languages of the claims.

What is claimed is:

1. A smart license plate detection system comprising:

a smart license plate including:

a housing having a rectangular structure defined by a back surface, a front surface opposite the back surface, and wall portions extending perpendicularly from a periphery of the back surface to form an inner cavity;

a display unit disposed at the front surface of the housing, the display unit having a rectangular shape corresponding to the front surface of the housing, and the display unit being spaced inwardly from a periphery of the front surface so as to leave a border region around the display unit, wherein the display unit covers the front surface except for the border region;

one or more LED strips disposed on the border region so that the one or more LED strips cover substantially the entirety of the border region and extending continuously along the entire periphery of the front surface of the housing and surrounding the display unit, the one or more LED strips being configured to display a status of a motor vehicle;

at least two circuit boards disposed within the inner cavity and operatively connected to the one or more LED strips;

a power management assembly disposed within the inner cavity and attached to the housing by one or more supporting components, the power management assembly being configured to supply power to the one or more LED strips;

an antenna positioned within the inner cavity of the housing to reduce electromagnetic screening when the smart license plate is attached to the motor vehicle, the antenna being configured to receive data from satellites through dedicated RF frequencies; and a main unit including a microcontroller configured to:

detect a moving motor vehicle using a detection module;

capture an RGB image of the motor vehicle to extract details in real time;

pre-process the captured image by converting the RGB image from three color channels (R, G, B) into a single-channel grayscale format;

locate a license-plate region within the captured image and segment the license-plate region from surrounding background content;

recognize a license plate by locating and segmenting the captured image from background content; and recognize characters on the license plate by detecting image frames and converting the characters into ASCII text;

a communication block configured to provide data exchange between the smart license plate, the main unit, a cloud server, an application, and an agency;

wherein the cloud server, the application, and the agency are operatively connected to the main unit through the communication block to enable remote monitoring and processing of vehicle information.

2. The system of claim 1, wherein the one or more LED strips are configured to emit yellow light to indicate that the vehicle is in partial compliance with a motor vehicle law or a category defined by regulation.

3. The system of claim 1, wherein the one or more LED strips are configured to emit green light to indicate that the vehicle is in total compliance with a motor vehicle law or a category defined by regulation.

4. The system of claim 1, wherein the one or more LED strips are configured to emit red light to indicate that the vehicle does not meet compliance requirements with a motor vehicle law or a category defined by regulation.

5. The system of claim 1, wherein the power management assembly comprises a battery management system, a power conversion unit, and an output power unit.

6. The system of claim 5, wherein the battery management system is configured to monitor and control charging and discharging of the power management assembly.

7. The system of claim 1, wherein the antenna is positioned at a lower portion within the inner cavity of the housing to further reduce electromagnetic screening when the smart license plate is attached to a motor vehicle.

8. The system of claim 1, wherein the display unit is configured to present a vehicle identification number and a jurisdictional logo simultaneously.

9. The system of claim 1, wherein the lid is removably secured to the wall portions of the housing to permit access to the inner cavity.

10. The system of claim 1, wherein the microcontroller is further configured to preprocess the captured RGB image to enhance contrast before converting the RGB image into a single-channel grayscale format.

11. The system of claim 1, wherein the one or more LED strips consist of a single continuous strip extending around the entire periphery of the front surface of the housing.

12. The system of claim 1, wherein the one or more LED strips consist of multiple discrete strips joined together around the entire periphery of the front surface of the housing.

13. The system of claim 1, wherein the display unit comprises an E-paper display configured to provide high-resolution text and images with a paper-like appearance.

14. The system of claim 1, wherein at least one of the circuit boards comprises a smart board configured to store vehicle information based on a department of motor vehicle database.

15. The system of claim 14, wherein the smart board is configured to receive notifications relating to a compliance status of the motor vehicle from the agency and transmit the notifications to a user device as an email or SMS message.

16. The system of claim 1, wherein the communication block comprises a GSM module, a Bluetooth module, a GPS module, and a 4G module.

17. The system of claim 16, wherein the Bluetooth module is configured to provide Wi-Fi credentials including an SSID and password to a user device.

18. The system of claim 1, further comprising a monitoring module associated with the agency and configured to monitor vehicle compliance data stored on the cloud server and to perform an enforcement or notification action based on the monitored data.

19. The smart license plate detection system of claim 18, wherein the action comprises initiating enforcement against a non-compliant vehicle or transmitting compliance notifications to a vehicle owner.

20. The system of claim 1, wherein the lid comprises a plurality of mounting holes configured to receive fasteners to secure the smart license plate to the motor vehicle.

* * * * *